United States Patent [19]

Gross et al.

[11] 3,776,562
[45] Dec. 4, 1973

[54] ADJUSTABLE MANDREL FOR CLAMPING A WORK PIECE

[75] Inventors: Werner Johann Gross, Heidelberg; Gunter Franz Lanzerath, Heidelberg-Wieblingen; Helmut Karl Patzer, Iigen; Joachim Klauss Maennchen, Wiesloch; Helmuth Rieger, Geidelberg-Wieblingen; Horst Weiberg, Edingen, all of Germany

[73] Assignee: Borg-Warner Stieber GmbH, Heidelberg, Germany

[22] Filed: Aug. 11, 1972

[21] Appl. No.: 280,007

[30] Foreign Application Priority Data
Aug. 20, 1971  Germany .................. G 71 31 831.5

[52] U.S. Cl. ............................................ 279/2, 82/44
[51] Int. Cl. .............................................. B23b 31/40
[58] Field of Search ................... 279/2, 1 A; 82/44

[56] References Cited
UNITED STATES PATENTS
308,639  12/1884  Stevens .................................. 82/44
2,469,873  5/1949  Ernest ..................................... 279/2

Primary Examiner—Leonidas Vlachos
Attorney—Donald W. Banner

[57] ABSTRACT

An adjustable mandrel for gripping a work piece includes a tapered arbor and collet having an adapter sleeve inserted therebetween. Preferably, a series of interchangeable adapter sleeves is provided for extending the gripping range of the mandrel.

16 Claims, 1 Drawing Figure

PATENTED DEC 4 1973
3,776,562
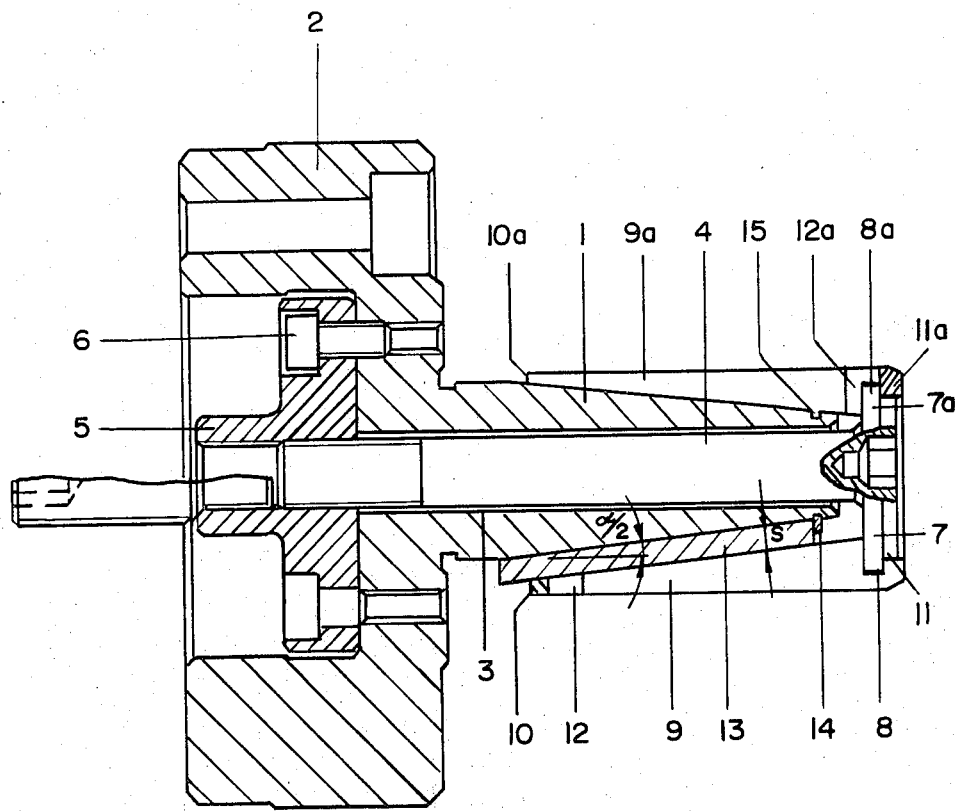

ADJUSTABLE MANDREL FOR CLAMPING A WORK PIECE

BACKGROUND OF THE INVENTION

1. Field of the Invention

The present invention relates generally to adjustable mandrels for clamping a work piece in a machine tool and more particularly to an expansible mandrel including a tapered arbor and slotted collet adapted for gripping a bore in a work piece. A mandrel corresponding to the bore of the work piece is attached to the spindle of the machine tool, and the work piece is placed upon the collet. The work piece is then clamped by expanding the collet. The expanding of the collet may be done manually or by power operation whereby pneumatic, hydraulic or mechanical devices are employed. A typical means of expanding the collet is by adjustment of an adjusting screw extending along the centerline of the mandrel in which the head of the screw pulls the collet onto the tapered arbor thereby expanding the collet.

2. Prior Art

Expansible mandrels according to the prior art include a tapered arbor and slotted tapered collet which have a narrow range of adjustment. A disadvantage of these prior devices is that the work pieces to be clamped must have approximately the same diameter of bore. In practice, it is typical to supply several collets of differing wall thicknesses for each arbor. Thus it is possible to clamp work pieces of various bores by means of a single arbor and a series of collets. A disadvantage of the series of collets is that the stiffness of the collet increases with increasing wall thickness thereby limiting the range of adjustment. It is typical to supply from four to nine collets for an arbor in order to cover a clamping range of from 2 to 20 millimeters. The clamping ranges are related to the sizes of the arbor such that smaller arbors are used for lower clamping ranges and larger arbors are used for a higher clamping range. In order to cover a clamping range of from 4 to 80 millimeters at least nine arbors are required with corresponding series of collets which requires the stocking of a large number of arbors and collets.

SUMMARY OF THE INVENTION

It is an object of the present invention to overcome the above described disadvantages of prior art devices. According to the present invention, the problem is solved by providing an adapter sleeve which can be inserted between the arbor and collet. The adapter sleeve has a constant wall thickness along its entire length and the included angle of the walls of the adapter sleeve is equal to the included angles of the inner surface of the collet and the outer surface of the arbor. The adapter sleeve provides a considerable increase in the clamping range of an arbor making it possible to encompass the range of expansion of the next larger arbor using respective collets.

The clamping range of an arbor with an adapter sleeve encompasses the normal clamping range of the arbor which is obtainable by direct mounting of the collet on the arbor, and an additional clamping range for the same arbor which is obtainable by fitting the adapter sleeve on the arbor together with the use of further collets which are fitted on the adapter sleeve.

The wall thickness of the adapter sleeve is preferably selected so that it is equal to the difference between the radii of two neighboring arbors of a known design. In the case of a series of arbors, the next larger arbor and more can be replaced by such an adapter sleeve thereby resulting in a considerable reduction of costs of tool storage.

Additional adapter sleeves of various wall thicknesses having the same inner dimensions can be provided for a given arbor. It is thereby possible to replace several subsequent arbors insofar as the stiffness of the initial arbor permits, by respective adapter sleeves. For example, the next one or two or even additional arbors of a series may be replaced by adapter sleeves.

The invention will be further described in terms of the example embodiment shown in the drawing.

BRIEF DESCRIPTION OF THE DRAWING

The FIGURE shows a longitudinal section view through an adjustable mandrel, with and without the adapter sleeve, the upper half of the FIGURE showing the arrangement of arbor and collet with the adapter sleeve removed, and the lower half of the FIGURE showing the adapter sleeve inserted between the arbor and collet.

DESCRIPTION OF THE PREFERRED EMBODIMENT

The arbor 1 shown in the FIGURE has a flange 2 by means of which the arbor is attached to the spindle of a machine tool not shown in the drawing. Arbor 1 includes a bore 3 extending along its centerline in which the adjusting screw 4 is received. The adjusting collar 5 of adjusting screw 4 is connected to flange 2 by means of cap screws 6.

The adjusting screw 4 is inserted into the collet 9, (9a) with its head 7, (7a) received in an annular groove 8, (8a). The collet 9, (9a) is otherwise of conventional design and is provided with longitudinal slots extending inwardly alternately from one end 10, (10a) and the other end 11, (11a) thereof. The longitudinal section of collet 9a shown in the upper half of the FIGURE is taken in the plane of a slot extending from one end 10a of the collet whereas the section shown in the lower half of the FIGURE is taken in the plane of a slot extending from the other end 11 thereof. The slots terminate in respective apertures 12 and 12a.

In the upper half of the FIGURE a collet 9a of usual design is shown mounted directly upon the arbor 1. By replacing the collet 9a with collets of a larger outside diameter, it is possible to obtain a clamping range of a few millimeters. The clamping range can be considerably increased, if the same arbor 1 is provided with the new adapter sleeve 13, as shown in the lower half of the FIGURE. The adapter sleeve 13 has a double cone design and is shifted upon the arbor 1. It is secured on the arbor 1 by means of a retainer ring 14 which is held in groove 15 of arbor 1 by spring resilience.

The subsequent arbor of a series of arbors can be eliminated by the adapter sleeve 13. The clamping of the work piece by means of expanding the collet is effected in the same way with and without the adapter sleeve. For example, the adjusting screw 4 is tightened by a hexagonal tool and the collet 9 is thereby shifted upon the arbor 1 with the adapter sleeve 13 and simultaneously expanded.

The wall thickness S is constant throughout the length of the adapter sleeve. The included or cone angle $\alpha$ of the adapter sleeve, the included or cone angle of the inner surface of collet, and the included or cone angle of the outer surface of the arbor are identical.

It is further to be noted that the invention can be adapted and or modified for use in other embodiments. While the illustrated embodiment is arranged for gripping a work piece on an inner surface, it is possible to provide a further embodiment within the teaching of the invention which is adapted for gripping a work piece on an outer surface thereof.

What is claimed is:

1. An improved adjustable mandrel for clamping a work piece, including a collet adapted for mounting on an arbor having a conical outer surface, said collet including a conical inner surface having an included angle equal to the included angle of said collet surface, said collet including longitudinal slotted portions alternately extending inwardly from opposite ends thereof, wherein the improvement comprises an adapter sleeve arranged and disposed for insertion between said arbor and said collet.

2. An improved adjustable mandrel according to claim 1 wherein said adapter sleeve has a constant wall thickness throughout its length.

3. An improved adjustable mandrel according to claim 1 wherein the included angles of the surfaces of said adapter sleeve are equal to the included angles of respective surfaces of said arbor and said collet.

4. An improved adjustable mandrel according to claim 2 wherein the included angle of the surfaces of said adapter sleeve is equal to the included angle of said arbor surface.

5. An improved adjustable mandrel according to claim 1, said arbor and collet adapted for interchangeably receiving respective ones of a series of adapter sleeves, each sleeve of said series having an inner surface of the same dimension, and each sleeve of said series having a different wall thickness.

6. An improved adjustable mandrel according to claim 5 wherein each sleeve of said series has a constant wall thickness through its length.

7. An improved adjustable mandrel according to claim 5 wherein the included angles of the surfaces of each sleeve of said series are equal to the included angles of respective surfaces of said arbor and said collet.

8. An improved adjustable mandrel according to claim 5 wherein the included angle of the surfaces of each sleeve of said series is equal to the included angle of said arbor surface.

9. An improved adjustable mandrel according to claim 1 wherein said adapter sleeve is secured on said arbor by means of a retainer ring.

10. An improved adjustable mandrel according to claim 2 wherein said adapter sleeve is secured on said arbor by means of a retainer ring.

11. An improved adjustable mandrel according to claim 3 wherein said adapter sleeve is secured on said arbor by means of a retainer ring.

12. An improved adjustable mandrel according to claim 4 wherein said adapter sleeve is secured on said arbor by means of a retainer ring.

13. An improved adjustable mandrel according to claim 5 wherein said adapter sleeve is secured on said arbor by means of a retainer ring.

14. An improved adjustable mandrel according to claim 6 wherein said adapter sleeve is secured on said arbor by means of a retainer ring.

15. An improved adjustable mandrel according to claim 7 wherein said adapter sleeve is secured on said arbor by means of a retainer ring.

16. An improved adjustable mandrel according to claim 8 wherein said adapter sleeve is secured on said arbor by means of a retainer ring.

* * * * *